United States Patent [19]

Cioc et al.

[11] 4,256,231

[45] Mar. 17, 1981

[54] CONTAINER WITH A SYNTHETIC LINING IMPERMEABLE TO LIQUIDS AND METHOD OF MAKING

[75] Inventors: Alexander Cioc, Düsseldorf; Werner Künzel, Langenfeld; Klaus Meyer, Kaarst, all of Fed. Rep. of Germany

[73] Assignee: Henkel Kommanditgesellschaft auf Aktien (Henkel KGaA), Dusseldorf-Holthausen, Fed. Rep. of Germany

[21] Appl. No.: 973,794

[22] Filed: Dec. 28, 1978

Related U.S. Application Data

[60] Continuation-in-part of Ser. No. 955,161, Oct. 27, 1978, abandoned, which is a division of Ser. No. 843,501, Oct. 19, 1977, abandoned.

[51] Int. Cl.³ .............................................. B65D 23/02
[52] U.S. Cl. ................................. 215/1 C; 215/12 R; 229/3.1; 264/512
[58] Field of Search ............... 264/512, 513, 515, 516, 264/510, 511, 514; 215/1 C, 1 R, 12 R; 229/3.1, 3.5 R, 4.5; 156/245, 287

[56] References Cited

U.S. PATENT DOCUMENTS

| | | | |
|---|---|---|---|
| 2,393,347 | 1/1946 | Stuart et al. | 229/3.1 X |
| 2,766,161 | 10/1956 | Hagopian et al. | 156/287 |
| 2,959,812 | 11/1960 | Allen | 264/511 X |
| 3,527,439 | 9/1970 | Lawmaster | 215/1 C |
| 3,561,629 | 2/1971 | Turner | 215/1 C |
| 3,576,651 | 4/1971 | Rattenbury | 215/1 C |
| 3,697,369 | 10/1972 | Amberg et al. | 229/3.1 X |
| 3,825,141 | 7/1974 | Campagna | 215/1 C |
| 3,898,310 | 8/1975 | Schiemann | 264/512 |
| 3,940,001 | 2/1976 | Haefner | 215/1 C |
| 4,117,061 | 9/1978 | Jorgenso | 264/512 X |

FOREIGN PATENT DOCUMENTS

112776 4/1941 Australia .................................. 215/1 C

Primary Examiner—Stephen Marcus
Attorney, Agent, or Firm—Hammond & Littell, Weissenberger and Muserlian

[57] ABSTRACT

A container comprising a non-deformable shell under ordinary stresses made from at least two cooperating parts which together constitute said shell, said shell being lined internally with and thermoplastically fused with a lining made of a liquid-impermeable thermoplastic material and a method of making said container, comprising (a) introducing at least two cooperating parts which together constitute a non-deformable shell under ordinary stresses into molding tool members which each have a contour corresponding to at least a portion of the outer surface of each part of the shell, (b) bringing the parts together, (c) applying a substantially even film of thermoplastic material at an elevated temperature and in an at least plastic state to the inner surface of the parts to produce on the internal surface of the wall of the shell a lining, which is liquid-impermeable and thermoplastically fused to the shell when the container is at ambient temperature, and (d) removing the container from the molding tool members.

11 Claims, 6 Drawing Figures

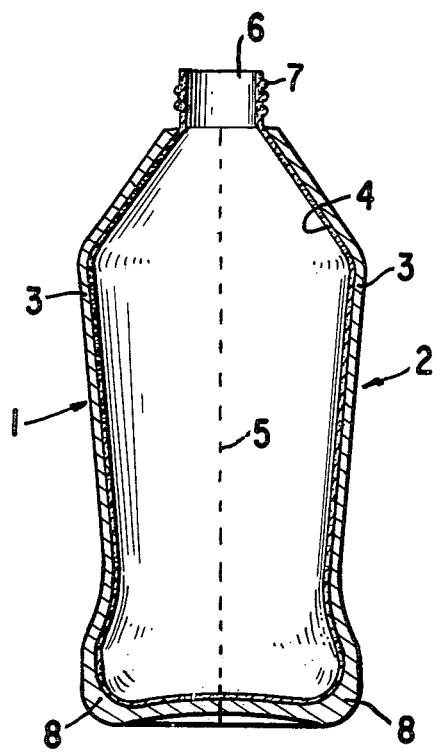
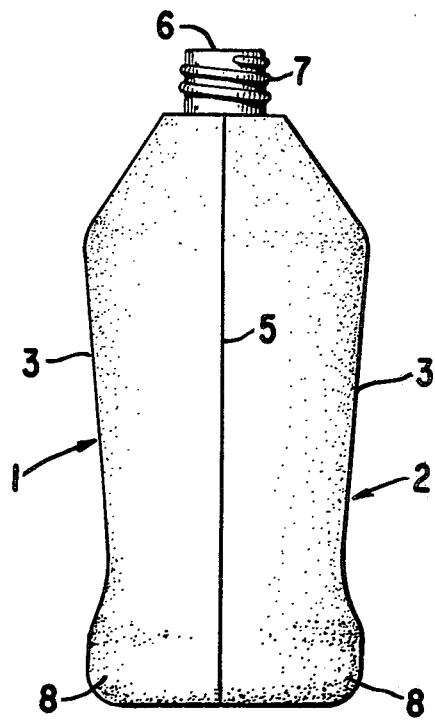
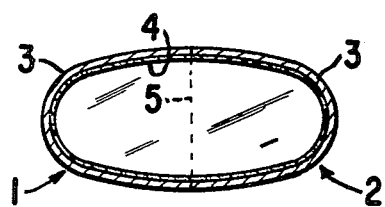

CONTAINER WITH A SYNTHETIC LINING IMPERMEABLE TO LIQUIDS AND METHOD OF MAKING

REFERENCE TO PRIOR APPLICATIONS

This is a continuation-in-part of Ser. No. 955,161, filed Oct. 27, 1978, now abandoned, which in turn is a division of Ser. No. 843,501, filed Oct. 19, 1977, and now abandoned.

THE PRIOR ART

When containers of synthetic material are not to be deformable, such as containers filled with milk, the wall thickness must be such that the container in the filled state has a certain outer shape as well as rigidity. The weight of the container material and thus the quantity of synthetic material used in making it is dependent, inter alia, on the weight of the product in the container, the size of the container, the forces to be experienced by the container during transit and the manner in which it is handled by the consumer. Therefore, most containers in use are those in which the wall thickness is greater by a multiple than would be required if only liquid compactness mattered. For the reduction of material expenditure, there have been attempts to produce containers of stable shape from compound materials.

In the production of known containers, thermoplastic synthetic material which has been rendered plastic or nearly liquid by heat is usually introduced into a molding tool. After introduction into the molding apparatus, a certain time must elapse until the container has hardened sufficiently for the molding tool to be opened and the finished container pushed out. The operation of such a machine, as for example a blowing machine, depends upon how rapidly cooling can take place. Occasionally, liquid carbon dioxide or even liquid nitrogen is used for cooling the molding tools. Obviously, the greater the wall thickness of the container, the more cooling that is required. Known containers of stable shape from synthetic materials thus require an appreciable amount of valuable synthetic material. Also production is expensive, especially insofar as the cooling of the molding tools is concerned.

OBJECTS OF THE INVENTION

An object of the present invention was, therefore, to develop a container for liquids which can be produced with less synthetic material than known containers and whose weight can be made less than that of known fully synthetic material containers.

Another object of the present invention was to develop a container which is composed of a shell and a lining coating the inner surface of the wall of the shell, wherein the shell consists of relatively inexpensive materials, as compared with the cost of the synthetic material of the lining.

A further object of the present invention was to develop a container which is composed of a shell and a lining, wherein the shell consists of materials which are substantially unharmful to the environment and are easily compressible after emptying of the container.

A still further object of the present invention was to develop a liquid-impermeable, non-deformable container of stable, variable shape consisting of a shell and a lining which can be produced with a minimum of expensive synthetic material, the outer shape and rigidity of which container are provided by prefabricated parts which together constitute the shell of the container.

A yet further object of the present invention is the development of a container comprising a non-deformable shell made from at least two cooperating parts which together constitute said shell, said shell being lined internally with and thermoplastically fused with a lining made of a liquid-impermeable thermoplastic material.

Another object of the present invention was to develop a method of producing in a mold a container composed of a shell with a lining of synthetic material impermeable to liquids on its inner wall, in which the container can be removed from the mold almost immediately after introducing the lining onto the shell without cooling of the molding equipment, thus increasing the rate of production and reducing the energy expenditure of the process.

A further object of the present invention was to develop a method of making a container, comprising:

(a) introducing at least two cooperating parts which together constitute a non-deformable shell into molding tool members which each have a contour corresponding to at least a portion of the outer surface of each part of the shell, (b) bringing the parts together, (c) applying a substantially even film of thermoplastic material at an elevated temperature and in an at least plastic state to the inner surface of the parts to produce on the internal surface of the wall of the shell a lining, which is liquid-impermeable and thermoplastically fused to the shell when the container is at ambient temperature, and (d) removing the container from the molding tool members.

These and other objects of the invention will become more apparent as the description thereof proceeds.

THE DRAWINGS

FIG. 1 is a side longitudinal cross-sectional view through the container of the invention;

FIG. 2 is a cross-sectional view of a horizontal plane through the container;

FIG. 3 is a side longitudinal view of the outside of the container;

DESCRIPTION OF THE INVENTION

Figure 4:
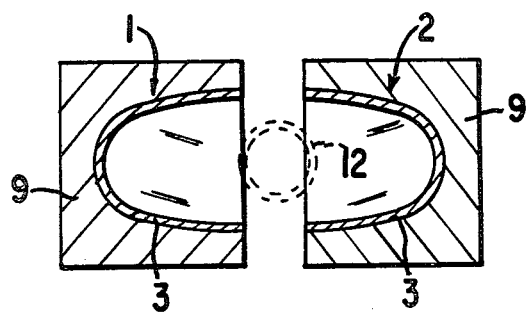
FIG. 4 is a cross-sectional view of a horizontal plane through the molding tools for the production of the container of the invention, said molding tools being in an open position.

The drawbacks of the prior art containers were overcome and the above objects were achieved in a container comprising a non-deformable shell, the shell being lined internally with and bonded to a lining made of synthetic thermoplastic material impermeable to liquid.

The invention more particularly resides in a container comprising a non-deformable shell made from at least two cooperating parts which together constitute said shell, said shell being lined internally with and thermoplastically fused with a lining made of a liquid-impermeable thermoplastic material. The segments can be connected with one another by joints. The container can be used for liquids, such as washing and cleaning agents, dyes and chemicals.

The requirements of liquid impermeability and non-deformability are attained by the lining and the shell, respectively. Since the shell itself consists of two assembled segments, it is not non-deformable without the synthetic material lining.

The non-deformable shell is designed to remain stable and rigid when the container is filled with liquid and subjected to transportation stresses. Preferably, the non-deformable shell has a wall thickness which is at least twice that required merely to retain liquid without deformation. The wall thickness of the non-deformable shell can be from 0.5 to 10 mm depending on the volume of the final container. However, areas of reinforcing having substantially greater thickness may be present, particularly at the bottom of the container.

For a container according to the present invention, constructed, for example, as a bottle, the amount of synthetic material required can be reduced to less than a quarter, compared with that required for known containers. The shell can comprise cheap materials, as compared with the synthetic material of the lining, such as cellulose, pasteboard, cardboard, foamed synthetic material such as foamed thermoplastic materials like polyethylene and polyvinyl chloride, glass fibers, products made from a mixture of the aforementioned materials or similarly cheap materials. These cheap materials can be preformed into the at least two halves of the shell. The invention enables a liquid-impermeable, stable container, of variable structural shape to be produced with a minimum of expensive synthetic material, such as thermoplastic polymers like polyethylene or polyvinylchloride, the outer shape and the shape stability of which container is provided by the parts making up the shell, which can be prefabricated, such as by pressing, molding and deep drawing.

According to another embodiment of the present invention there is provided a method of making a container, comprising applying a synthetic thermoplastic material at an elevated temperature and in an at least plastic state to the inner surface of a shell, which forms the wall of the container, to produce on the internal surface of the wall of the shell a lining, which is impermeable to liquids and intimately bonded to the shell when the container is at ambient temperature.

The invention, more particularly, resides in a method of making a container, comprising:

(a) introducing at least two cooperating parts which together constitute a non-deformable shell into molding tool members which each have a contour corresponding to at least a portion of the outer surface of each part of the shell, (b) bringing the parts together, (c) applying a substantially even film of thermoplastic material at an elevated temperature and in an at least plastic state to the inner surface of the parts to produce on the inner surface of the wall of the shell a lining, which is liquid-impermeable and thermoplastically fused to the shell when the container is at ambient temperature, and (d) removing the container from the molding tool members.

The container can be pushed out of the molding equipment, almost immediately after the incorporation of the lining onto the engaging parts of the shell, because unlike the known containers, the stability of the container's shape is no longer provided by the synthetic material, which is plastic because it is still hot, but by the shell. The previous, as a rule indispensable, cooling of the molding tools is no longer required. Therefore, not only the rate of production is increased, but also the energy expenditure is reduced. An advantage of the process of the invention is that the bonding and, optionally, shape-locking connection between the synthetic material of the lining, which is plastic during molding and for a certain time thereafter, and the shell develops without any outside assistance during the cooling and rigidification of the synthetic material. The energy content of the synthetic material heated up to softening, which heretofore had to be removed by an energy-consuming cooling of the molding tools, is utilized to produce the bonding connection.

Because of the non-deformity of the outer shell, the thickness of the inner plastic lining need only be sufficient to adequately coat the entire inner surface of the container. Ordinarily, the wall thickness of the inner plastic lining is from 0.2 to 1 mm.

In the production of a container according to the present invention, material accumulations or reductions can be provided at any desired location of the parts, so that the internal wall of the parts can be so constructed that an optimum wall thickness of the molded material is attainable. Also reinforcing ribs, which cannot be seen from outside the container, can, for example, be provided on the internal wall of the parts.

The lining of synthetic material can also have reinforced regions, for example, a self-supporting or reinforced closure opening, which can be provided with a screw thread, for example, in the case of a bottle. A closure stub can protrude outwardly through a hole fitted into the shell, possibly at the boundary of shell parts abutting one another. The production of a container with such reinforced synthetic material region presents no difficulties, since the machine on which the containers are made can be programmed for the delivery of the synthetic material.

The invention thus includes a container as above described, wherein the shell has an opening, the lining projects through the opening and has a non-deformable region outside the opening, the non-deformable region of the lining also having an opening and being cooperable with a closure member to close the opening in the lining.

Preferably the container of the invention is designed to contain liquids. By a proper design of the various dimensions of the non-deformable shell assembly and the plastic lining, containers can be produced for varying volume of liquids from 25 cc to 20 liters.

Figure 5:
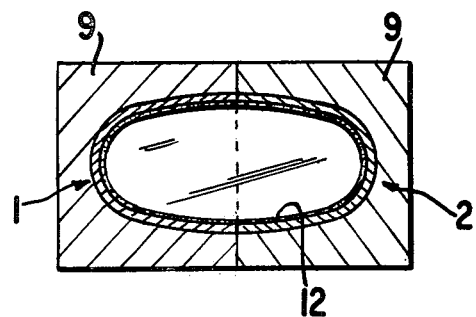
FIG. 5 is a cross-sectional view of a horizontal plane through the molding tools for the production of the container of the invention, said molding tools being in a closed position.
Figure 6:
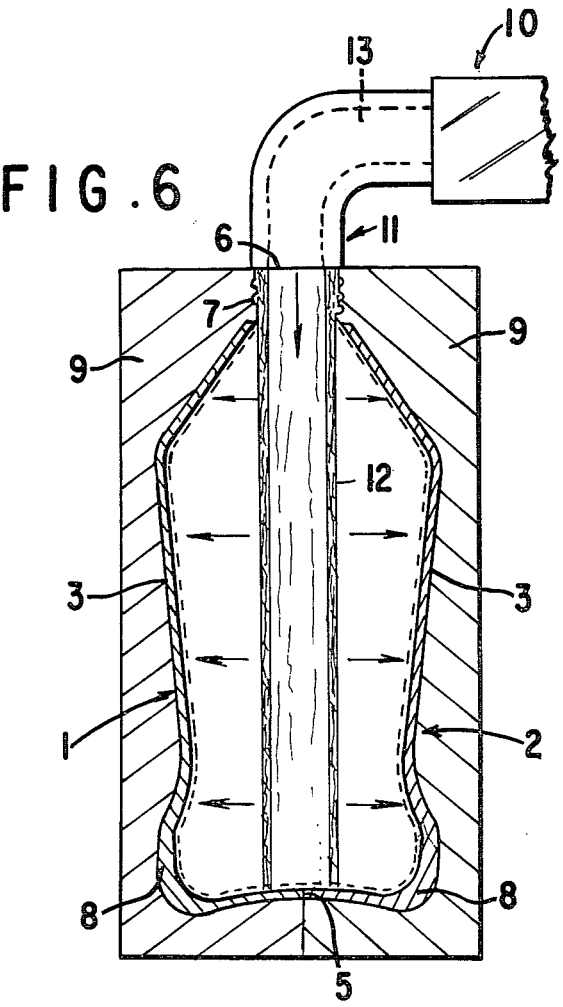
FIG. 6 is a side longitudinal cross-sectional view through the molding tools in a blow-molding machine.

An embodiment of the present invention and a method of making the embodiment will now be more particularly described by way of example with reference to the figures of the accompanying drawings, in which:

FIGS. 1 to 3 show different sections and views of a container in the form of a bottle, and FIGS. 4 to 6 show different stages of the production process of the container shown in FIGS. 1 to 3.

FIG. 1 shows a longitudinal section, FIG. 2 a cross-section, and FIG. 3 an external view of the container. The container comprises a shell 3, mechanically stabilizing the container and formed of parts 1 and 2, and a liquid-tight lining 4 lining the inner wall of the shell.

The parts 1 and 2 abut one another at a separating plane 5, the entire container being held together by a bonding and fastening connection between the surface of the lining 4 and the inside of the shell 3.

The lining 4 has a reinforced closure opening 6, which is provided with a screw thread 7. The shell 3 has reinforcing regions 8 at its lower part, which are likewise bonded to the lining 4 and, possibly, are incorporated by the lining 4. The lining 4 can thus bond or fasten together the individual parts making up the container into a unitary assemblage.

FIGS. 4 and 5 show in cross-section, in an open and closed position, respectively, molding tools for the production of the container shown in FIGS. 1 to 3. A longitudinal cross-section of the same molding tools in a blow-molding machine is shown in FIG. 6.

FIG. 4 shows the position of the molding tools 9, where the molding shells thereof are still separated from one another. Loosely laid into the molding shells are the parts 1 and 2 of the shell 3 of the container.

FIG. 6 shows an extruder 10 with a feed stub 11 for delivery of the synthetic thermoplastic material into the molding tools. In the blowing of the lining 4 a tube-shaped portion 12 of thermoplastic material extending from the extruder 10 by way of the feed stub 11, which thermoplastic material becomes at least softly plastic on heating, is introduced into the molding tools during the closing of these tools. After closing of the molding tools 9 (FIG. 5), the part of the thermoplastic material 12 disposed in the equipment is so blown out by compressed air, introduced along passage 13, that it deposits itself on all sides against the internal wall of the parts 1 and 2 of the shell 3. This stage of the operation is shown in FIG. 5.

In known methods of producing synthetic material containers, a cooling phase would have to follow at this point until the shaped container became sufficiently hard to be pushed out of the molding tools without becoming deformed. In the above-illustrated example of the method according to the present invention, the freshly blown lining 4 is, however, surrounded by a rigid shell 3. The molding tools can thus be opened immediately after the molding-in of the lining 4 and the container can be pushed out. With cooling starting when the container is still in the mold and continuing after pushing-out of the container, a bonding and possibly also shape-locking connection forms between the lining 4 and the shell 3 comprising the parts 1 and 2, in such a way that the container, consisting of the thin-walled, liquid-impervious lining and the originally separated parts, becomes an integral object of stable shape.

Apart from extrusion-blowing, the lining 4 can also be produced by dip-molding, injection-blowing, spraying, etc. The parts forming the shell can likewise be formed in a known manner, for example, by pressing, injection-molding, deep-drawing or casting. It is in many cases, desirable to decorate the parts of the shell before introducing them into the molding tools for the production of the container.

The present invention has the following advantages:

Without loss of its mechanical rigidity, the container can be produced with less synthetic material than is used in known containers. The stability of its shape is produced by other substances, viz., those making up the shell. By proper choice of the material of the shell, the container can be made substantially less harmful to the environment than was the case with known containers. Also rubbish disposal as, for example, in the household is facilated, since the container, if its shell consists of, for example, pasteboard or cardboard, is easily compressible after emptying.

The molding tools do not have to be specially cooled. By letting the molding tools cool down gradually in air, the bonding connection between the shell and the synthetic material lining is improved. Since outside cooling is dispensed with, the rate of production of containers can be increased.

Stabilizing elements, such as stiffening ribs, which are not visible from the outside, can be incorporated in the shell or in the parts thereof.

The actual weight of the container without difficulty can be made less than that of a known fully synthetic material container.

The preceding specific embodiment is illustrative of the practice of the invention. It is to be understood, however, that other expedients known to those skilled in the art, or disclosed herein may be employed without departing from the spirit of the invention or the scope of the appended claims.

We claim:

1. A necked container comprising an outer shell and a one-piece inner liner, said outer shell consisting of two mated parts formed from a material selected from the group consisting of cellulose, pasteboard, cardboard and a mixture thereof, said parts being abutted together at a mating seam, said liner being a liquid-impermeable thermoplastic material and being thermoplastically bonded to said mated parts to fuse said mating parts together, said shell being that component of said container that lends structural rigidity thereto.

2. The container of claim 1, wherein the thermoplastic material comprises polyethylene.

3. The container of claim 1, wherein the thermoplastic material comprises polyvinyl chloride.

4. The container of claim 1, wherein the shell is made from two halves.

5. The container of claim 1, wherein the shell comprises cellulose.

6. The container of claim 1, wherein the shell comprises cardboard.

7. The container of claim 1, wherein the shell is provided with reinforcing means.

8. The container of claim 1, wherein the shell has a wall thickness of from 0.5 to 10 mm with areas of reinforcing of greater wall thickness at the bottom of said container.

9. The container of claim 1, wherein the lining has a wall thickness of from 0.2 to 1 mm within said shell, with areas of reinforcing of greater wall thickness.

10. The container of claim 1, wherein said outer shell has an opening for a neck extension, said inner lining projects through said outer shell opening and has a non-deformable neck outside said outer shell opening, said non-deformable neck also having an opening and being cooperative with a closure member to close said non-deformable neck opening.

11. The container of claim 1, wherein said outer shell has a wall thickness of from 0.5 to 10 mm and said inner lining has a wall thickness of from 0.2 to 1 mm.

* * * * *

UNITED STATES PATENT AND TRADEMARK OFFICE
CERTIFICATE OF CORRECTION

PATENT NO. : 4,256,231
DATED : March 17, 1981
INVENTOR(S) : Alexander Cioc et al.

It is certified that error appears in the above—identified patent and that said Letters Patent is hereby corrected as shown below:

On the Title Page, insert

-- 30  Foreign Application Priority Data

October 21, 1976       Fed. Rep. of Germany     2647607 --.

Signed and Sealed this

Second Day of February 1982

[SEAL]

Attest:

GERALD J. MOSSINGHOFF

*Attesting Officer*     *Commissioner of Patents and Trademarks*